United States Patent Office 3,288,729
Patented Nov. 29, 1966

3,288,729
OPEN-CELL POLYVINYL CHLORIDE FOAM
Raymond R. Waterman, Easton, Kenneth M. Deal, Norwalk, and Peter A. Whitman, Haddam, Conn., assignors to R. T. Vanderbilt Company, Inc., New York, N.Y., a corporation of New York
No Drawing. Filed Dec. 6, 1962, Ser. No. 242,653
16 Claims. (Cl. 260—2.5)

The present invention pertains to a process for producing polyvinyl chloride foam, compositions for use therein and a unique vinyl foam product produced thereby.

This application is a continuation-in-part of copending application Serial No. 167,424, filed January 19, 1962, and now abandoned.

Polyvinyl chloride foam or sponge, whether open cell or closed cell, is produced from a plastisol by expanding or foaming the plastisol and then heating it to gel and fuse the expanded or cellular structure. The foam is generally produced by one of three methods. In the compressed gas method, a gas, such as carbon dioxide or nitrogen, is dissolved in the plastisol under pressure. Upon release of the pressure, the dissolved gas expands in the plastisol to form the plastisol into a closed cell vinyl sponge. A further process involves the use of chemical blowing agents which decompose in the plastisol to release a gas, such as nitrogen, within the plastisol to form the foam or sponge. The remaining major method for forming polyvinyl chloride foam involves the mechanical beating or frothing of a plastisol to incorporate air therein.

The major drawbacks to the compressed gas method is that it requires the use of comparatively expensive bottled gases, expensive refrigeration equipment for precise low temperature control and complicated high pressure machinery. The use of chemical blowing agents is disadvantageous, because these agents are expensive and the process is difficult to control, thereby resulting in foam products which are not uniform in cell structure, density and thickness. The present day mechanical beating process is unsatisfactory for light density foams, because the foamed plastisol tends to collapse prior to or during fusion thereof so that the resulting foam is not uniform in cross-section and the cells vary in size.

It is, therefore, an object of the present invention to provide a unique polyvinyl chloride foam by a novel mechanical frothing or beating process so that there will be no collapse of the foam and so that the resulting foam will have a fine, uniform, open cell structure. A further object is to provide such a foam product and process and compositions for use therein such that the resulting fine, uniform, open-cell polyvinyl chloride foam will have a wide range of densities varying from about 5 to 50 pounds per cubic foot and a wide range of RMA compression varying from about 6 to 200 pounds.

These objects of the present invention are achieved provided several critical factors are carefully observed. Thus, a certain critical amount of soap and water must be present in the polyvinyl chloride plastisol prior to the frothing or beating thereof to form the foam. It was found that an alkali metal soap must be present in the plastisol prior to frothing or beating in order to prevent collapse of the foam and to provide a fine, uniform, open cell structure therein, the soap being incorporated into the unfoamed plastisol either by direct addition to the plasticizer or preferably by foaming the soap in situ in the plasticizer. It is especially preferred that the soap be formed in situ in a small portion only of the total plasticizer used. The soap-forming ingredients must be completely reacted before mechanical foaming of the plastisol. It was further found that the amount of water present in the plastisol must be kept at a minimum in order to prevent the upsetting of the gelling and fusing of the foam and the ruining of the foam structure.

A polyvinyl chloride plastisol is a dispersion of finely divided polyvinyl chloride resin particles in liquid plasticizer for the polyvinyl chloride resin. Typical useful plastisol grade or dispersion stir-in type polyvinyl chloride resins include Geon 121 (a high molecular weight polyvinyl chloride stir-in type plastisol resin sold by the B. F. Goodrich Chemical Company), Exon 654 (a similar resin sold by the Firestone Plastic Company), Marvinol VR-50 and VR-53 (general purpose polyvinyl chloride plastisol resins sold by the Naugatuck Chemical Company) and Opalon 410 (a polyvinyl chloride plastisol grade resin sold by the Monsanto Chemical Company). Where it is desired to reduce the fusing temperature, a portion, such as an amount up to about 30% by weight, of the vinyl chloride homopolymer resin can be replaced by or blended with a vinyl chloride copolymer plastisol resin, for example Geon 135 sold by the B. F. Goodrich Chemical Company.

The liquid plasticizer present in the plastisol as a dispersion medium for the polyvinyl chloride resin particles is used in varying amounts depending upon the nature of the plasticizer and the polyvinyl chloride resin. In general, the plasticizer is used in an amount from about 35 to about 400 parts by weight per 100 parts by weight of the polyvinyl chloride resin. Usually the plastisol will contain from about 54 to about 95 parts by weight of the plasticizer per 100 parts by weight of the polyvinyl chloride resin. Typical suitable plasticizers include dioctyl phthalate or di-(2-ethylhexyl) phthalate; butyl decyl phthalate; dicapryl phthalate; butyl benzyl phthalate; dioctyl adipate; dioctyl sebacate; tricresyl phosphate; trioctyl phosphate; cresyl diphenyl phosphate; acetyl tributyl citrate; dipropylene glycol dibenzoate; epoxy-type plasticizers, such as Monoplex S-73 (Rohm & Haas); polymeric plasticizer, such as Paraplex G-50 (Rohm & Haas); and butadiene-acrylonitrile copolymers, such as Hycar 1312 (B. F. Goodrich Chemical Company). Generally, these plasticizers are used in conjunction with one another to form composite plasticizer systems.

The choice of plasticizer should take into consideration its effect on plastisol rheology and its ability to hold or release air. Experience has shown that a plastisol viscosity of 1500 to 10,000 cps. as measured on a Brookfield viscometer at 30 r.p.m. with a No. 4 spindle can be used satisfactorily in the process of the invention. Below this lower viscosity, the efficiency of the plastisol to hold air is reduced. Above this upper viscosity, the problem of transferring the plastisol is increased materially.

The plastisol used must have the property of thinning out with stirring. Using a Brookfield viscometer, flow properties can be checked by measurements at two spindle speeds. Thixotropic plastisols will show a reduction in viscosity at the higher spindle speed. Newtonian plastisols will give approximately equal readings at either speed. Both thixotropic and Newtonian plastisols are satisfactory for use in the process of the present invention. However, dilatant plastisols show an increase in viscosity at the higher spindle speed and are difficult to use in the process.

A good air release plasticizer required for many plastisol applications is not desirable for use in the present process, since the process of the invention functions by the mechanical entrapment of air in the plastisol. However, small amounts of excellent air release plasticizers can be used where specific properties are desired in the finished foam.

In addition to the dispersed phase, namely the plastisol grade polyvinyl chloride resin, and the dispersion medium, namely the liquid plasticizer, the polyvinyl chloride plastisols can contain, if desired, various conventional additives. Usually heat and light stabilizers are present which are lead, tin, zinc, cadmium and barium compounds or complexes, such as those stabilizers sold under the trade names Vanstay RZ 25, Vanstay HTA, Vanstay SA and Vanstay RR–Z (R. T. Vanderbilt Co.). The heat and light stabilizers are normally present in the plastisol in an amount from about 0.5 to about 6 parts by weight per 100 parts by weight of the polyvinyl chloride resin, and more usually in an amount from about 1 to about 4 parts by weight per 100 parts by weight of the polyvinyl chloride resin.

Fillers of the low oil absorption type are frequently employed in the plastisols to lower the cost of the finished foam and to modify its properties, typical fillers being calcium carbonate and talc or hydrous magnesium silicate. When fillers are employed in the plastisol, they are generally present in an amount up to about 10 parts by weight of the filler per 100 parts by weight of the polyvinyl chloride resin.

Where a colored or tinted polyvinyl chloride foam is desired, colorants or color-fast pigments are incorporated into the plastisol. The colorants or pigments will usually be present in the plastisol in an amount of about 1 part by weight per 100 parts by weight of the polyvinyl chloride resin.

Mold release agents need not be present in the plastisol. Frequently the plastisols will contain organic nonsoap surfactants to serve as viscosity regulators. Typical organic nonsoap surfactants include the nonionic, anionic and cationic nonsoap surfactants, such as polyethylene glycol 400 monolaurate, a polyhydric alcohol ester sold by the Glyco Products Company; Ethomeen S–15, a tertiary amine ethylene oxide condensation product with primary fatty (soybean) amine sold by the Armour Company; and Solar 25, a combination of coconut fatty acid amine condensate and a special type amine sulfonate sold by Swift and Company. If used, these nonsoap surfactants or viscosity regulators are ordinarily present in the plastisol in an amount from about 0.4 to about 12 parts by weight per 100 parts by weight of the polyvinyl chloride resin, and more usually in an amount from about 1 to about 4 parts by weight per 100 parts by weight of the resin.

As noted above, an essential component of the plastisol in accordance with the present invention is an alkali metal soap, i.e., an alkali metal salt of a saturated or unsaturated fatty acid or mixtures thereof having from 12 to 24 carbon atoms, and preferably having 18 carbon atoms. Typical examples thereof include the potassium, and sodium salts of lauric, myristic, palmitic, stearic, oleic, linoleic, and linolenic acids. The soap is present in the plastisol in an amount from about 1 to about 8 parts by weight per 100 parts by weight of the plastisol. The soap is incorporated into the plastisol by first blending it with all or preferably a small portion of the plasticizer, then mixing the soap-plasticizer blend plus any further necessary plasticizer with the polyvinyl chloride resin. The soap may be incorporated into the plasticizer by direct addition thereto, although it is preferred for convenience and ease in preparing the plasticizer combination to form the soap in situ by blending all or preferably a small portion of the plasticizer with a fatty acid and a stoichiometric equivalent of a saturated aqueous solution of a soap-forming base, such as sodium hydroxide, potassium hydroxide, sodium carbonate, and potassium carbonate. The soap, which serves as a foam promoter or frothing aid and stabilizes or prevents collapse of the foam, must be present in the plastisol prior to beating or frothing thereof and hence cannot be added or formed in situ during or after frothing or foaming of the plastisol.

Water is present in the plasticizer combination or foam former of the invention, and hence in the plastisol prepared therefrom, only by virtue of the fact that it is needed as a medium for conveniently incorporating or blending the soap per se or the soap-forming base into the plasticizer. The water content of the plastisol, however, must be kept to as low a value as possible, namely from about 0.2 to about 1.8 parts by weight per 100 parts by weight of the plastisol. The presence of larger amounts of water in the plastisol injures the foam structure and upsets the gelation of the foam. Any water present in the plastisol has to be removed from the foam by distillation and the evaporation of the excessive amounts of water, particularly from thick sections of foam, tears up the air cells and destroys the foam structure inside the foam.

Thus the preferred frothing aid and foam stabilizing two phase water-in-oil emulsion composition of the invention comprises from about 2 to about 16 parts by weight of an alkali metal soap and from about 0.4 to about 3.6 parts by weight of water, the soap being dissolved in and the water being dispersed in from about 1 to about 4 parts by weight of a plasticizer. If it is desired to render this liquid composition phase stable, there can be incorporated therein from about 1 to about 4 parts by weight of an above mentioned organic nonsoap surfactant. The composition preferably also contains from about 1 to about 4 parts by weight of an above mentioned heat and light stabilizer. This liquid or free flowing emulsion, as opposed to a difficult to mix and utilize viscous to semi-solid product, is prepared by first blending the plasticizer plus nonsoap surfactant, if used, with the saturated aqueous solution of soap-forming base and then adding the blend to the fatty acid or adding the fatty acid to the blend, the soap being thereby formed in situ. This composition is used in the process of the invention by mixing from about 6 to about 30 parts by weight thereof with from about 54 to about 95 parts by weight of plasticizer and then blending from about 60 to about 125 parts by weight of the resulting soap-plasticizer combination with about 100 parts by weight of a polyvinyl chloride resin to form a plastisol.

In the process of the present invention, all or preferably a small portion of the plasticizer containing the alkali metal soap and water is mixed until the blend is smooth and uniform and until the soap-forming base and fatty acid have reacted to form the soap in situ in the plasticizer. The mixing can be performed with a marine type downthrust propeller or high shear mixers and suitable agitation to ensure uniform blending. The plastisol is formed by adding the plasticizer-soap combination plus any further necessary plasticizer to the polyvinyl chloride resin or vice versa, mixing until uniform with a Hobart batch mixer or other high shear mixer of similar type. Plastisols prepared in this way can be used immediately or, if desired, they can be stored up to seven weeks or even longer, because they have substantially constant gel-free flow characteristics during storage.

The plastisol is mechanically beaten or frothed to incorporate air therein by using a Hobart batch mixer or preferable an Oakes continuous mixer or similar equipment to form a liquid foam. Normal foaming temperature is from about 18° C. to about 45 °C. After formation of the foam into the desired shape by spreading or pouring into a mold, it is heated at a temperature from about 143° C. to about 185° C. for from about 30 seconds to about 4 hours to gel and fuse it. Gelation can be effected as a separate operation by heating at a temperature from about 60° C. to about 88° C. for from about 10 seconds to about 2 hours. During the gelation period, the liquid foam swells slightly (10–12%) as the heat expands the air inside the discrete or closed cell structure and the liquid foam solidifies to a soft gel. Fusion can be obtained as a separate operation by further heating at a temperature from about 143° C. to about 185° C. for from about 20 seconds to about 4 hours. As fusion occurs, the discrete or closed cells become interconnecting or open cell and the expanded foam returns to its original dimensions. Radiofrequency or dielectric heating, radiant heat and circulating hot air heating are suitable for the gelling and fusing procedure. The temperature and time of heating, of course, will vary with the nature of the components present in the plastisol and the thickness and density of the foam. After heating, the fused foam is cooled to room temperature.

The compositions and process of the invention are illustrated by the following examples.

EXAMPLE 1

In a typical example of a composition and process of the invention, the following three plasticizers, viscosity regulator (nonsoap surfactant) and stabilizer respectively were blended thoroughly with a "Lightnin'" mixer having a marine type propeller to form a plasticizer blend.

*Plasticizer blend*

| Components: | Parts by weight |
|---|---|
| Butyl benzyl phthalate | 50.0 |
| Dicapryl phthalate | 20.0 |
| Monoplex S-73 [1] | 20.0 |
| Polyethylene glycol 400 monolaurate | 2.0 |
| Vanstay RZ 25 [2] | 2.5 |
| Total | 94.5 |

[1] Monoplex S-73 = epoxy type plasticizer (Rohm & Haas).
[2] Vanstay RZ 25 = a complex mixture of barium, cadmium and zinc organo-metallic compounds with chelating agents and selected organic solvents, a heat and light stabilizer (R. T. Vanderbilt Co., Inc.).

A soap-forming base (potassium hydroxide) and then a fatty acid (oleic acid) were added to the plasticizer blend and mixed with the Lightnin' mixer until the soap had formed in situ.

*Plasticizer concentrate*

| Components: | Parts by weight |
|---|---|
| Plasticizer blend (above) | 94.5 |
| Potassium hydroxide (50% aqueous solution) | 2.8 |
| Oleic acid | 7.0 |
| Total | 104.3 |

The resulting plasticizer concentrate was added slowly to an equal amount of plastisol grade polyvinyl chloride resin (Geon 121), blended in a Hobart mixer using No. 1 speed and a B blade, and the mixing continued until the batch was smooth and uniform.

*Plastisol*

| Components: | Parts by weight |
|---|---|
| Geon 121 | 100.0 |
| Plasticizer concentrate (above) | 100.0 |
| Total | 200.0 |

The resulting plastisol mixture was foamed in a 4–M Oakes mixer at a pump speed of 160 r.p.m. (1 lb./min.), a rotor speed of 500 r.p.m., an air pressure regulator setting of 80 p.s.i., an air rotameter setting of 15 and a back pressure of 55 p.s.i., which was obtained by manipulation of the auger valve at the outlet of the mixing head. The foam was delivered through 15 feet of ½" internal diameter flexible tubing. Gel time for a 1" thick slab was one hour at 70° C. The slab was fused for two hours at 160° C. and then cooled to room temperature.

The final density of the finished foam was 10.7 lb./cu. ft. The foam was characterized by its fine, uniform, predominantly open cell structure. RMA compression (the number of pounds weight required to compress a sample of foam 25% over an area of 50 square inches) was 30.8 pounds.

EXAMPLE 2

To demonstrate the use of typical plasticizers in the polyvinyl chloride plastisol, foams were made using the method and formulation of Example 1, but varying the proportions and kinds of plasticizers used to form other plasticizer blends as follows:

PLASTICIZER COMBINATIONS

| Components | Parts by Weight | | | | | | |
|---|---|---|---|---|---|---|---|
| | PC1 | PC2 | PC3 | PC4 | PC5 | PC6 | PC7 |
| Butyl benzyl phthalate | 50 | 50 | 50 | 50 | 50 | 50 | 48 |
| Monplex S-73 [1] | 10 | | | | 20 | | 19 |
| Dicapryl phthalate | 30 | 20 | 30 | 10 | 20 | 35 | 19 |
| Tricresyl phosphate | | 20 | 10 | 30 | | 5 | |
| Hycar 1312 [2] | | | | | | | 10 |

PROPERTIES OF FINISHED FOAM

| | | | | | | | |
|---|---|---|---|---|---|---|---|
| Density (lb./cu. ft.) | [3] | 12.9 | 13.9 | 11.3 | 10.7 | [3] | 14.4 |
| RMA Compression (lbs.) | | 39.9 | 76.4 | 39.6 | 30.8 | | 66.2 |

[1] Monoplex S-73 = epoxy type plasticizer (Rohm & Haas).
[2] Hycar 1312 = liquid polymeric plasticizer, a butadieneacrylonitrile copolymer of medium high acrylonitrile content (B. F. Goodrich Chemical Company).
[3] These two foams were prepared on a Hobart mixer but were not fused.

These plasticizer combinations all produced satisfactory finished foams of fine, uniform, open cell structure when substituted for the combination of three plasticizers in the plasticizer blend of Example 1.

EXAMPLE 3

Various soap-forming combinations were substituted for the oleic acid and potassium hydroxide used in the method and formulation given in Example 1.

SOAP-FORMING COMBINATIONS

| Components | Parts by Weight | | | | | | | | |
|---|---|---|---|---|---|---|---|---|---|
| | SFC1 | SFC2 | SFC3 | SFC4 | SFC5 | SFC6 | SFC7 | SFC8 | SFC9 |
| KOH (50% aqueous solution) | 0.7 | 1.4 | 2.8 | 2.8 | 4.2 | 5.6 | | 1.4 | 2.8 |
| NaOH (50% aqueous solution) | | | | | | | 2.8 | | |
| Oleic acid | 1.75 | 3.5 | 5.2 | 7.0 | 10.5 | 14.0 | 7.0 | | |
| Stearic acid | | | | | | | | | 7.0 |
| Neofat 42-12 [1] | | | | | | | | 1.4 | |

PROPERTIES OF FINISHED FOAM

| | | | | | | | | | |
|---|---|---|---|---|---|---|---|---|---|
| Density (lb./cu. ft.) | 13.8 | 15.0 | 16.4 | 12.9 | 12.0 | 13.3 | 15.1 | 11.9 | 10.8 |
| RMA Compression (lbs.) | 73.5 | 73.6 | 98.7 | 39.9 | 47.3 | 47.5 | 82.1 | 46.7 | 31.1 |

[1] Neofat 42-12 = fractinated tall oil (46% oleic, 39% linoleic, 3% linolenic and 12% rosin acids) (Armour & Co.)

All of these soap-forming combinations gave satisfactory finished foams of fine, uniform, open cell structure.

EXAMPLE 4

To illustrate the effect of varying the nature and amount of nonsoap surfactant, the process and formulation of Example 1 was modified by substituting four different soap-forming systems and four different nonsoap surfactants therein. In the following Table I the amounts of soap, water and viscosity regulator (nonsoap surfactant) are expressed as parts by weight per 100 parts by weight of plastisol.

EXAMPLE 6

To demonstrate the compatability of different types of polyvinyl chloride stabilizers in the composition of the invention, the Vanstay RZ 25 stabilizer in the process of Example 1 was replaced in an additional series of foams by other heat and light stabilizers, namely by Vanstay HTA (a complex mixture of barium and cadmium compounds of the R. T. Vanderbilt Co., Inc.), 1.5 parts by weight per 100 parts by weight of plastisol; by 0.25 part by weight per 100 parts by weight of plastisol of Vanstay SA (a complex mixture of phosphite and phenolic compounds in selected vehicles of the R.

TABLE I

| Run No. | 1 | 2 | 3 | 4 | 5 | 6 | 7 | 8 | 9 |
|---|---|---|---|---|---|---|---|---|---|
| Water, total | 0.48 | 0.95 | 0.245 | 1.81 | 0.94 | 0.48 | 0.94 | 0.95 | 0.94. |
| Soap, type | K oleate | K oleate | K oleate | K oleate | Na oleate | K Neofat [1] | K Stearate | K oleate | K oleate. |
| Soap, total | 2.08 | 4.08 | 1.06 | 7.77 | 3.83 | 2.07 | 4.04 | 4.07 | 4.04. |
| Nonsoap Surfactant, type. | | | Nonionic [2] | Nonionic [2] | Nonionic [2] | Nonionic [2] | Nonionic [2] | Cationic [3] | Nonionic/Anionic.[4] |
| Nonsoap Surfactant, total. | | | 1.07 | 0.98 | 1.02 | 1.04 | 1.02 | 0.26 | 6.02. |

PROPERTIES OF FINISHED FOAM

| Density (lb./cu. ft.). | 14.4 | 14.0 | 13.8 | 13.3 | 15.1 | 11.9 | 10.8 | 13.9 | 13.6. |
|---|---|---|---|---|---|---|---|---|---|
| RMA Compression (lbs.). | 66.2 | 58.4 | 73.3 | 47.5 | 82.1 | 46.7 | 31.1 | 58.3 | 69.3. |

[1] Neofat 42-12=fractionated tall oil (46% oleic, 39% linoleic, 3% linolenic and 13% rosin acids) (Armour & Co.).
[2] Nonionic surfactant=polyethylene glycol 400 monolaurate, a polyhydric alcohol ester (Glyco Products Co.).
[3] Cationic surfactant=Ethomeen S-15, a tertiary amine ethylene oxide 5 moles condensation product with primary fatty (soybean) amine (Armour & Co.).
[4] Nonionic/anionic combination=Solar 25, combination of coconut fatty acid amine condensate and a special type amine sulfonate (Swift and Co.)

These data show that nonsoap surfactants are not required for production of fine, uniform, open cell structure. Nonionic, anionic or cationic surfactants can be used to regulate viscosity, if desired.

EXAMPLE 5

Fillers are compatible with the plasticizer system of the invention. The process of Example 1 was modified by incorporating 10 parts by weight of filler (Atomite and Nytal 200 L) per 100 parts by weight of resin. Atomite is a ground natural calcium carbonate supplied by Thompson-Weinman and Company having a specific gravity of 2.71, a particle size of 0.5–10 microns range and 2.5 microns average and a pH of 9.3. Nytal 200 L is a low oil absorption talc supplied by the R. T. Vanderbilt Company, Inc., having a specific gravity of 2.85±.03, a fineness of 97.5% passing a 325 mesh sieve, and a maximum moisture content of 0.5% determined at 100–105° C.

| | Filler | |
|---|---|---|
| | Atomite | Nytal 200 L |
| Properties of Finished Foam: | | |
| Density (lb./cu. ft.) | 16.1 | 16.1 |
| RMA Compression (lbs.) | 59.5 | 42.5 |

The finished foams all had a fine, uniform, open cell structure.

T. Vanderbilt Co., Inc.); and by 3.0 parts by weight per 100 parts by weight of plastisol of Vanstay RR–Z (a mixture of barium, cadmium and zinc compounds in selected organic solvents of the R. T. Vanderbilt Co., Inc.). The finished foams had a fine, uniform, open cell structure and the original white color was retained through the heat of processing (gelation and fusion).

EXAMPLE 7

The process of Example 1 was modified by forming the plastisol in accordance with the following procedure.

The materials set forth below were blended together in the order listed with a Lightnin Mixer to form a phase stable liquid frothing aid and foam stabilizer emulsion A.

*Emulsion A*

| Components: | Parts by weight |
|---|---|
| Butyl benzyl phthalate | 2.0 |
| Polyethylene glycol 400 monolaurate | 2.0 |
| Potassium hydroxide (50% aqueous solution) | 2.8 |
| Oleic acid | 7.0 |
| Vanstay HTA | 1.5 |
| Vanstay SA | 0.25 |
| Total | 15.55 |

Emulsion A was then blended with various plasticizers and the resulting blends mixed with vinyl chloride polymer dispersion resin to form the following plastisols:

*Plastisols*

| Components | Parts by Weight | | | | | |
|---|---|---|---|---|---|---|
| Polyvinyl chloride dispersion resin (Geon 121) | 100.0 | 100.0 | 100.0 | 100.0 | 85 | 70 |
| Vinyl chloride copolymer dispersion resin (Geon 135) | | | | | 15 | 30 |
| Dipropylene glycol dibenzoate | 46.4 | | 36.7 | | 46.4 | 46.4 |
| Butyl benzyl phthalate | | 46.4 | | 45.0 | | |
| Dicapryl phthalate | 19.3 | 19.3 | | 9.8 | 19.3 | 19.3 |
| Dioctyl phthalate | | | 29.0 | | | |
| Tricresyl phosphate | | | | 29.4 | | |
| Epoxy type plasticizer (Monoplex S-73) | 19.3 | 19.3 | 19.3 | | 19.3 | 19.3 |
| Emulsion A (above) | 15.0 | 15.0 | 15.0 | 15.8 | 15.0 | 15.0 |
| Total | 200 | 200 | 200 | 200 | 200 | 200 |

EXAMPLE 8

The necessity of having the alkali metal soap present in the plastisol prior to beating or frothing thereof to form foam was shown by parallel trials in which soap-forming components were added to the plasticizer of a plastisol long enough before foaming to assure soap formation on the one hand, and added shortly before frothing on the other hand.

*Plasticizer blend*

Components: Parts by weight
Butyl benzyl phthalate _____ 50.0
Monoplex S-73 _____ 10.0
Dicapryl phthalate _____ 30.0
Vanstay RZ-25 _____ 2.5
Polyethylene glycol 400 monolaurate _____ 2.0

Total _____ 94.5

The above components were blended with a Lightnin Mixer to form a plasticizer blend and the following addition made.

Soap-forming base: Parts by weight
50% aqueous potassium hydroxide solution __ 1.4

After thoroughly blending with a Lightnin Mixer, the following was added.

Fatty acid and water: Parts by weight
Oleic acid [1] _____ 2.6
Tap water [1] _____ 1.5

[1] Premixed with spatula.

The mixing was continued until the resulting plasticizer concentrate was uniform.

*Plastisol*

Components: Parts by weight
Exon 654 resin _____ 100.0
Plasticizer concentrate (above) _____ 100.0

200.0

The required amount of polyvinyl chloride resin (Exon 654) was weighed into the 3 quart bowl of a Hobart mixer. Using the B blade at No. 1 speed, the plasticizer concentrate was added to the resin slowly until the plastisol mixture became uniform. In Trial No. 1, the mixing time was continued for 105 minutes to permit the complete in situ formation of soap. In Trial No. 2, however, the mixing was continued for only 6 minutes at which time the plastisol mixture was uniformly blended but soap had not been formed in situ.

The required amount of plastisol was weighed into the bowl of the 3 quart Hobart and whipped with the cage beater, and subsequently heated for gelation and fusion and then cooled. The following results were obtained:

| | Trial No. 1 | Trial No. 2 |
|---|---|---|
| Plastisol | 200 grams | 200 grams |
| Foaming Time | 5 minutes | 20 minutes |
| Foaming Speed | No. 3 | No. 3 |
| Density of the fused or finished foam | 27.7 lbs./cu. ft | No foam was formed |

In Trial No. 1 where soap was formed in situ in the plastisol prior to beating or frothing the finished foam was satisfactory, but in Trial No. 2 where the soap was not formed in situ in the plastisol, even extended beating or frothing failed to form a stable foam, i.e., the beaten plastisol collapsed as soon as agitation was stopped.

It will be noted that all of the examples illustrate that the compositions and process of the invention enable the production of fine, uniform, open cell polyvinyl chloride foams having densities ranging from about 5 to about 50 pounds per cubic foot and RMA compressions ranging from about 6 to about 200 pounds. Foam collapse was completely obviated.

The uniform open cell vinyl foam product of the invention is dimensionally stable and has all of the desirable properties generally associated with vinyl products. It is soft to the touch and conveys the impression of resilience without bounciness. Color retention and aging characteristics are excellent. Inorganic acids and alkalis have no damaging effects. The vinyl foam product is resistant to swelling in oils, alcohols and aliphatic hydrocarbons. Greases will not attack it. Flame resistance can be obtained by selection of the proper plasticizer in the plastisol formulation.

Laundering tests on laminates of the vinyl foam product with dimensionally stable fabrics indicate good service life for these composite materials. No discoloration of the foam occurs after repeated machine washings with synthetic detergents, and outdoor drying in sunlight. Foam adhesion to cotton, rayon, and nylon is excellent. These features indicate uses as padding for brassieres or insulation in a variety of wearing apparel applications ranging from comfortable, long lasting shoe insoles to weather shielding headwear.

Uses as a cushioning material include public seating in buildings, airplanes, buses, and subway or railway cars where flame resistance may be a required property. Good outdoor aging characteristics reveal its utility in equipment for patios, swimming pools, stadium cushions, and camping equipment. In fabricating articles for such application, a non-porous plastisol coating may be deposited on the surface of the form before addition of the foamed material. Upon fusion, the protective skin adheres firmly to the underlying cellular structure.

The vinyl foam product of the invention is characterized by a unique set of properties which differentiate it from all other heretofore known vinyl foams and even other conventional foams made from different chemicals as shown by the following tabulation of comparative properties.

|  | Vinyl Foam of the Invention | Compressed Gas Vinyl Foam | Chemically Blown Vinyl Foam | Polyurethane Foam | Pin Cored Natural Rubber Latex Foam |
|---|---|---|---|---|---|
| Appearance of cut surface of foam | Dull | Dull | Dull | Glittering | Dull. |
| Shape of Cells | Spherodial | Irregular | Irregular | Polyhedral | Spherodial. |
| Cross-Sectional Contour of Cells | Orbiculate | Irregular | Irregular | Polygonal | Orbiculate. |
| Apparent Diameter of a Typical Cell (microns).[1] | 250 | 1,120 | 850 | 1,000 | 600. |
| Uniformity of Cell Size | Uniform | Non-uniform | Non-uniform | Non-uniform | Non-uniform. |
| External Surface Appearance | Porous, extremely fine cell | Relatively thick impervious layer. | Relatively thick imperivous layer. | Relatively thick impervious layer.[3] | Generally porous, extremely fine cell. |
| Density (lbs./cu. ft.) | 5–50 | 4–70 | 4–70 | 1–2.5 | 4–50. |
| RMA Compression (lbs.) | 6–200 | Generally not determined.[4] | Generally not determined.[4] | 10–40 | 8–200. |
| Resilience (Percent Rebound)[2] | 20–30 | 20–40 | 10–40 | 40–55 | 50–70. |
| Hand [5] | Soft, silky | Coarse, harsh | Firm, harsh | Medium firm, harsh. | Medium firm, silky. |
| Outdoor Aging | Good | Good | Good | Poor | Very poor. |
| Sunlight Aging | Pales | Pales | Pales | Darkens | Darkens. |

[1] Apparent diameter of a typical cell = the length in microns of the largest cell (exclusive of so-called "voids") seen on a cut surface of the foam.
[2] Resilience (Percent Rebound) = determined on a Nopco resiliometer using ASTM test D–1564–59T.
[3] Generally trimmed off.
[4] RMA Compression values are usally not determined because values obtained on thin foams such as these which need to be plied up are not comparable with those obtained on samples having uniform structures throughout.
[5] Usage conforms to that of textile and foam rubber art.

It will be appreciated that various modifications and changes may be made in the invention in addition to those described above without departing from the spirit thereof and accordingly the invention is to be limited only within the scope of the appended claims.

What is claimed is:

1. A composition especially adapted for the formation of a fine, uniform, open-cell polyvinyl chloride foam by the incorporation of air therein which comprises an unfoamed polyvinyl chloride plastisol having substantially constant gel-free flow characteristics during storage and containing from about 1 to about 8 parts by weight of an alkali metal soap per 100 parts by weight of plastisol, said soap being an alkali metal salt of a fatty acid having from 12 to 24 carbon atoms, and from about 0.2 to about 1.8 parts by weight of water per 100 parts by weight of plastisol.

2. The composition as set forth in claim 1 wherein the soap is potassium oleate.

3. The composition as set forth in claim 1 wherein the soap is sodium oleate.

4. The composition as set forth in claim 1 wherein the soap is the potassium salt of tall oil fatty acids.

5. The composition as set forth in claim 1 wherein the soap is potassium stearate.

6. A liquid two phase water-in-oil emulsion especially adapted for promoting foam formation and preventing collapse thereof by the incorporation of air into an unfoamed polyvinyl chloride plastisol containing the emulsion which consists essentially of from about 2 to about 16 parts by weight of an alkali metal soap and from about 0.4 to about 3.6 parts by weight of water, the soap being dissolved in and the water being dispersed in from about 1 to about 4 parts by weight of a polyvinyl chloride plasticizer, said soap being an alkali metal salt of fatty acid having from 12 to 24 carbon atoms.

7. A phase stable liquid emulsion as set forth in claim 6 which further contains from about 1 to about 4 parts by weight of an organic nonsoap surfactant.

8. A phase stable liquid emulsion as set forth in claim 7 which further contains from about 1 to about 4 parts by weight of a polyvinyl chloride heat and light stabilizer.

9. A process for producing a fine, uniform, open-cell polyvinyl chloride foam which comprises mixing a polyvinyl chloride plasticizer providing from about 1 to about 8 parts by weight of an alkali metal soap per 100 parts by weight of plastisol and from about 0.2 to about 1.8 parts by weight of water per 100 parts by weight of plastisol; blending the resulting soap-plasticizer combination with polyvinyl chloride resin to form a plastisol; mechanically beating or frothing air into the plastisol to form a liquid foam; heating the liquid foam to gel and fuse it; and cooling the fused foam to room temperature.

10. The process as set forth in claim 9 wherein the soap is formed in situ in the plasticizer mix prior to formation of plastisol and beating.

11. The process as set forth in claim 10 wherein the soap is potassium oleate.

12. The process as set forth in claim 10 wherein the soap is sodium oleate.

13. The process as set forth in claim 10 wherein the soap is the potassium salt of tall oil fatty acids.

14. The process as set forth in claim 10 wherein the soap is potassium stearate.

15. A process for producing a fine, uniform, open-cell polyvinyl chloride foam which comprises mixing from about 54 to about 95 parts by weight of a polyvinyl chloride plasticizer with from about 6 to about 30 parts by weight of a liquid emulsion comprising from about 2 to about 16 parts by weight of an alkali metal soap and from about 0.4 to about 3.6 parts by weight of water, the soap being dissolved in and the water being dispersed in from about 1 to about 4 parts by weight of a polyvinyl chloride plasticizer; blending from about 60 to about 125 parts by weight of the resulting soap-plasticizer combination with about 100 parts by weight of a polyvinyl chloride resin to form a non-dilatant plastisol having a viscosity of 1500–10,000 cps. (Brookfield spindle No. 4 at 30 r.p.m.) and containing from about 1 to about 8 parts by weight of an alkali metal soap per 100 parts by weight of plastisol and from about 0.2 to about 1.8 parts by weight of water per 100 parts by weight of plastisol; mechanically beating or frothing air into the plastisol to form a liquid foam; heating the liquid foam at a temperature from about 143° C. to about 185° C. for from about 30 seconds to about 4 hours to gel and fuse it; and cooling the fused foam to room temperature.

16. The process as set forth in claim 15 wherein the heating step is a two-stage operation, namely heating the liquid foam at a temperature from about 60° C. to about 88° C. for from about 10 seconds to about 2 hours to gel it and further heating the gelled foam at a temperature from about 143° C. to about 185° C. for from about 20 seconds to about 4 hours to fuse it.

(References on following page)

References Cited by the Examiner

UNITED STATES PATENTS

| | | | |
|---|---|---|---|
| 2,567,988 | 9/1951 | Bethe | 260—2.5 |
| 2,608,536 | 10/1952 | Sterling | 260—2.5 |
| 2,666,036 | 1/1954 | Schwencke | 260—2.5 |
| 2,881,141 | 4/1959 | Smythe | 260—2.5 |
| 2,909,493 | 10/1959 | Bush | 260—2.5 |
| 3,085,074 | 4/1963 | Burke et al. | 260—2.5 |
| 3,113,116 | 12/1963 | Smythe et al. | 260—2.5 |

MURRAY TILLMAN, *Primary Examiner.*

JAMES A. SEIDLECK, *Examiner.*

M. FOELAK, *Assistant Examiner.*